(12) United States Patent
Zhou

(10) Patent No.: US 8,291,312 B1
(45) Date of Patent: Oct. 16, 2012

(54) DISPLAYING WEB PAGES WITHOUT DOWNLOADING STATIC FILES

(75) Inventor: Xin Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/413,376

(22) Filed: Mar. 6, 2012

(51) Int. Cl.
G06F 17/00 (2006.01)
G06F 15/177 (2006.01)

(52) U.S. Cl. ........ 715/234; 715/205; 715/236; 715/255; 715/273; 709/203; 709/217; 709/220

(58) Field of Classification Search .................. 715/200, 715/201, 202, 204, 205, 206, 207, 209, 226, 715/234, 235, 236, 238, 239, 243, 249, 251, 715/253, 255, 256, 273, 700, 760; 709/201, 709/202, 203, 204, 205, 217, 218, 219, 220, 709/221, 223
See application file for complete search history.

(56) References Cited

U.S. PATENT DOCUMENTS

| 7,096,418 | B1* | 8/2006 | Singhal et al. ............... 715/205 |
| 7,111,017 | B1* | 9/2006 | Forood et al. ........................ 1/1 |
| 2003/0110272 | A1* | 6/2003 | du Castel et al. ............. 709/229 |
| 2009/0307602 | A1* | 12/2009 | Brewer et al. ................. 715/744 |

* cited by examiner

*Primary Examiner* — Maikhanh Nguyen
(74) *Attorney, Agent, or Firm* — Harrity & Harrity, LLP

(57) ABSTRACT

A computing device is configured to receive a configuration file. The configuration filed includes at least one reference to a static file associated with a web page of a website. The static file is ranked as a most-downloaded static file, of a plurality of static files, by a provider of the configuration file and the website. The computing device is further configured to retrieve the static file based on the reference; store the static file in a memory local to the computing device; receive a request for the web page; identify the static file for the web page; and use the static file to display the web page in a browser associated with the computing device.

15 Claims, 7 Drawing Sheets

DISPLAYING WEB PAGES WITHOUT DOWNLOADING STATIC FILES

BACKGROUND

Users are increasingly utilizing World Wide Web (web) browsers to access a growing variety of web pages via the Internet. When a client device, such as a personal computer, uses a web browser to download a web page, the client device often has to download various files, such as images, for the web page. When the client device downloads the web page again at a later time, the client device often has to again download the same various files. Downloading and re-downloading files for web pages may take a considerable amount of time, particularly when slow Internet connections are used. As a result, a quality of experience of a user, of the client device, suffers.

SUMMARY

According to one aspect, a method may include receiving, by a computing device, a configuration file. The configuration file may include at least one reference to a static file associated with a web page of a website. The static file may be ranked as a most-downloaded static file, of a plurality of static files, by a provider of the configuration file and the website. The method may further include storing, by the computing device, the configuration file in a memory local to the computing device; retrieving, by the computing device, the static file based on the reference; storing, by the computing device, the static file in the memory local to the computing device; receiving, by the computing device, a request for the web page; identifying, by the computing device, the static file for the web page; and using, by the computing device, the static file to display the web page in a browser associated with the computing device.

According to another aspect, a computer-readable medium may include a plurality of instructions which, when executed by at least one processor of a computing device, cause the at least one processor receive a configuration file. The configuration file may include at least one reference to a static file associated with a web page of a website. The static file may be ranked as a most-downloaded static file, of a plurality of static files, by a provider of the configuration file and the website. The plurality of instructions may further cause the processor to retrieve the static file based on the reference, store the static file in a memory local to the computing device, receive a request for the web page, identify the static file for the web page, and use the static file to display the web page in a browser associated with the computing device.

According to yet another aspect, a server device may include a memory and a processor. The memory may store a configuration file and a static file. The configuration file may include a reference to the static file. The static file may be for a web page, and may be ranked as a most-downloaded static file, of a plurality of static files, by a provider of the configuration file. The processor may retrieve the static filed based on the reference, store the static filed in the memory, transmit a request for the web page to a server that provides the web page, receive information associated with the web page from the server, identify the static file for the web page based on the information, and use the static file to display the web page in a browser.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

An implementation described herein may allow a client device to download and store a configuration file that includes static files for various web pages. A static file may include an image file, a JavaScript file, a cascading style sheet (CSS) file, a dynamic content file, and/or any other type of information or file that is required to properly display a web page. Accordingly, when a browser of the client device is used to download a web page from a server, the browser may retrieve a static file, for the web page, from the configuration file instead of downloading the static file from the server. Additionally, or alternatively, the configuration file may include one or more references, such as links, for the static files. The browser may download the static files based on the references. The browser may be able to display the web page with information from the static file without having to wait until the static file is downloaded from the server. The quality of a user's experience may improve due to a decreased wait time until the web page is displayed by the browser. Furthermore, as opposed to browser caching, the browser may download static files that may be required for web pages which will be downloaded by the client device in the future.

Figure 1:
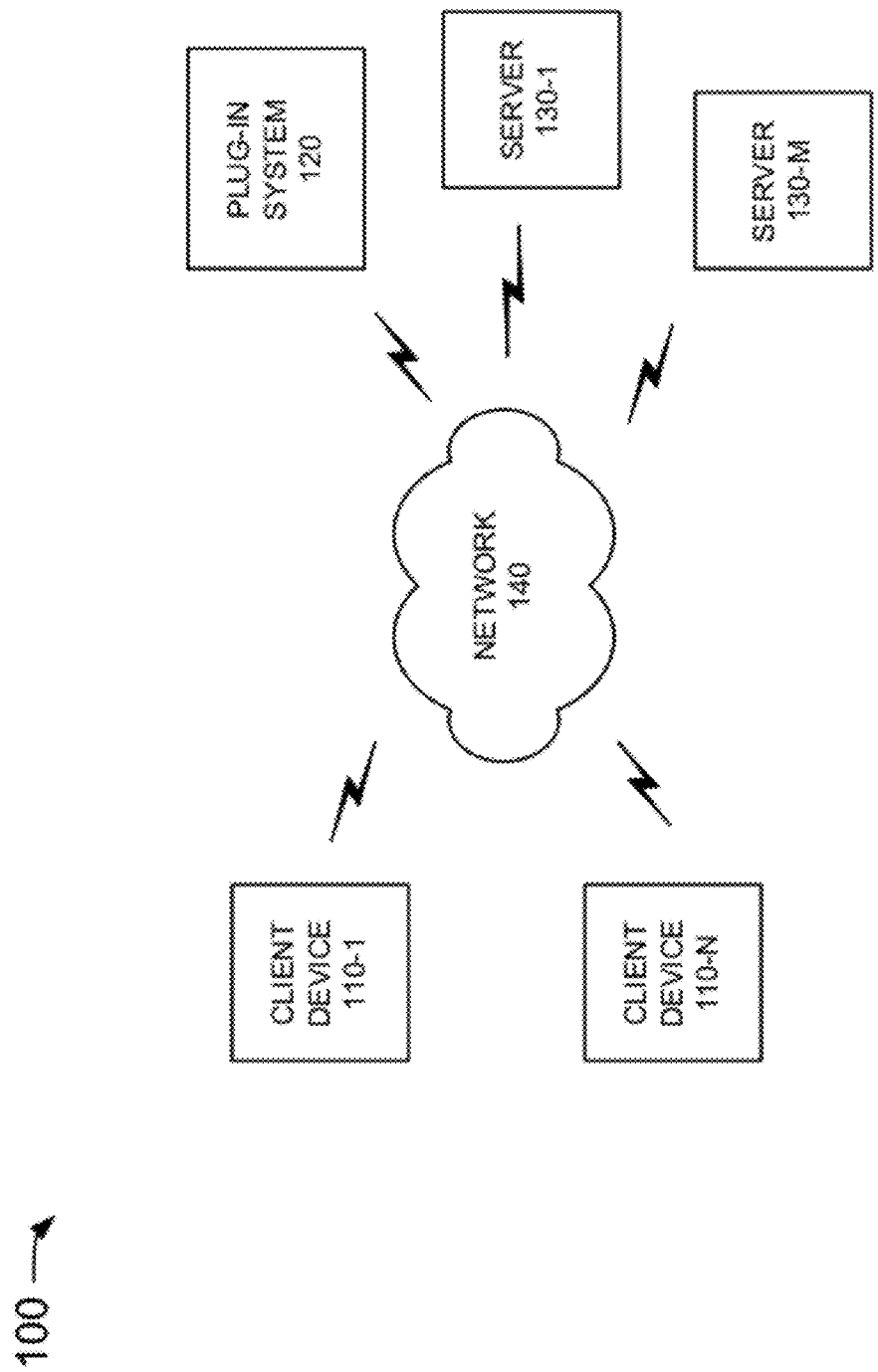
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include one or more of the following components: client devices 110-1 through 110-N (N≧1) (collectively referred to as "client devices 110" and individually as "client device 110"), a plug-in system 120, servers 130-1 through 130-M (M≧1) (collectively referred to as "servers 130" and individually as "server 130"), and a network 140. In practice, environment 100 may include additional components, fewer components, different components, or differently arranged components than are shown in FIG. 1. In some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. For example, server 130 may include plug-in system 120. Also, the components of environment 100 may interconnect via wired and/or wireless connections. In other words, any two components, of environment 100, may communicate via a wired connection, a wireless connection, or a combination of a wired connection and a wireless connection.

Client device 110 may include a computation and/or communication device, such as a communication device that is capable of communicating, via network 140, with plug-in system 120 and/or servers 130. In one implementation, client device 110 may take the form of a web service terminal, a personal computer, a laptop, a tablet computer, a handheld computer, a smart phone, a mobile telephone device, a personal digital assistant (PDA), a personal media player, a set-top box (STB) connected to a video display device (e.g., a television), or any other type of computation or communication device capable of receiving data from, for example, plug-in system 120 and/or servers 130.

Plug-in system 120 may include one or more server devices and/or one or more computer systems that provide configuration files to client devices 110. In one implementation, plug-in system 120 may generate a configuration file based on information received from servers 130. The configuration file may include static files, and/or links to the static files, that are typically provided, for web pages, by one or more of servers 130 to client devices 110. Plug-in system 120 may provide a browser plug-in, such as a toolbar, which includes the configuration file, to client devices 110. Thereafter, plug-in system 120 may generate updated configuration files based on new information received from servers 130, and may provide the updated configuration files to client devices 110.

Servers 130 may include server devices that gather, process, search, and/or implement functions in a manner described herein. Each server 130 may be implemented as a single server device or a collection of server devices that may be co-located or remotely located. Additionally, or alternatively, any two or more of servers 130 may be implemented within a single, common server device or a single, common collection of server devices. While servers 130 are shown as separate components, it may be possible for one or more of servers 130 to perform one or more of the functions of another one or more of servers 130.

Servers 130 may provide a wide variety of information and/or services, such as e-mail, news, video-sharing, e-commerce, etc. Server 130 may provide a web page and associated static file(s) to client device 110 in response to a browser request, such as a Hypertext Transfer Protocol (HTTP) request, from client device 110. Servers 130 may provide, to plug-in system 120, information, including one or more of the statistic files, that plug-in system 120 uses to generate configuration files.

Network 140 may include a single network, multiple networks of a same type, or multiple networks of different types. For example, network 140 may include one or more of: a direct connection between devices/components, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, or any combination of the aforementioned networks.

Figure 2:
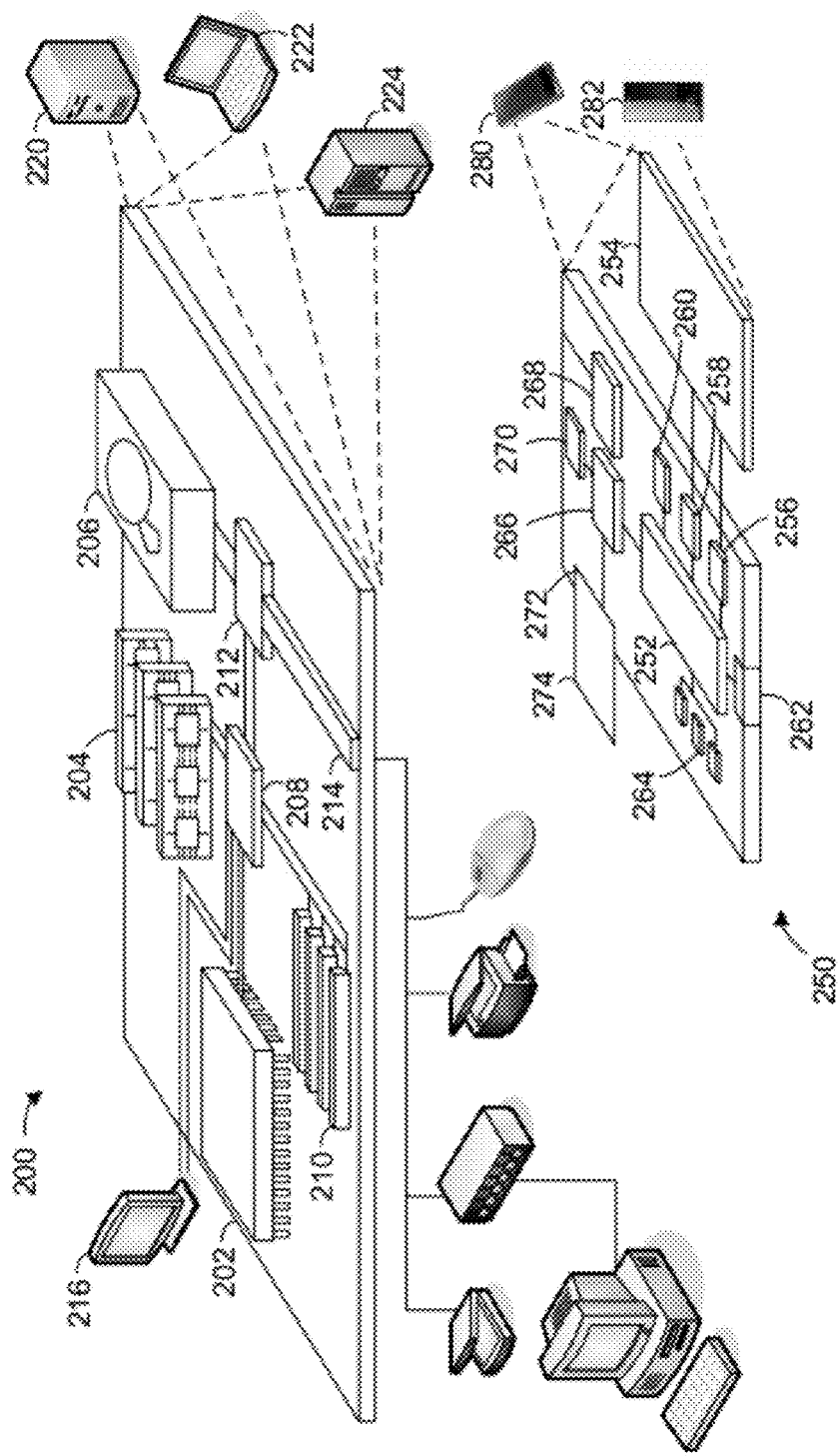
FIG. 2 illustrates an example of a computing device and a mobile computing device.

FIG. 2 is a diagram that shows an example of a computing device 200 and a mobile computing device 250, which may be used with the techniques described herein. Computing device 200 may correspond to, for example, client device 110, plug-in system 120, and/or server 130. Mobile computing device 250 may correspond to, for example, client device 110.

Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 200 may include a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, may be interconnected using various busses, and may be mounted on a common motherboard or in other manners as appropriate. Processor 202 may process instructions for execution within computing device 200, including instructions stored in the memory 204 or on storage device 206 to display graphical information for a graphical user interface (GUI) on an external input/output device, such as display 216 coupled to high speed interface 208. In another implementation, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system, etc.).

Memory 204 may store information within computing device 200. In one implementation, memory 204 may include a volatile memory unit or units. In another implementation, memory 204 may include a non-volatile memory unit or units. Memory 204 may also be another form of computer-readable medium, such as a magnetic or optical disk. A computer-readable medium may be defined as a non-transitory memory device. A memory device may include memory space within a single physical memory device or spread across multiple physical memory devices.

Storage device 206 may provide mass storage for computing device 200. In one implementation, storage device 206 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 204, storage device 206, or memory included within processor 202.

High speed controller 208 may manage bandwidth-intensive operations for computing device 200, while low speed controller 212 may manage lower bandwidth-intensive operations. Such allocation of functions is an example only. In one implementation, high-speed controller 208 may be coupled to memory 204, display 216 (e.g., through a graphics processor or accelerator), and to high-speed expansion ports 210, which may accept various expansion cards (not shown). In the implementation, low-speed controller 212 may be coupled to storage device 206 and to low-speed expansion port 214. Low-speed expansion port 214, which may include various communication ports (e.g., USB, Bluetooth, Ethernet, wireless Ethernet) may be coupled to one or more input/ output devices, such as a keyboard, a pointing device, a scanner, or a networking device, such as a switch or router, e.g., through a network adapter.

Computing device 200 may be implemented in a number of different forms, as shown in FIG. 2. For example, it may be implemented as a standard server 220, or multiple times in a group of such servers. It may also be implemented as part of a rack server system 224. Additionally or alternatively, computing device 200 may be implemented in a personal computer, such as a laptop computer 222. Additionally or alternatively, components from computing device 200 may be combined with other components in a mobile device (not shown), such as mobile computing device 250. Each of such devices may contain one or more of computing device 200, mobile computing device 250, and/or an entire system may be made up of multiple computing devices 200 and/or mobile computing devices 250 communicating with each other.

Mobile computing device 250 may include a processor 252, a memory 264, an input/output (I/O) device such as a display 254, a communication interface 266, and a transceiver 268, among other components. Mobile computing device 250 may also be provided with a storage device, such as a microdrive or other device (not shown), to provide additional storage. Each of components 250, 252, 264, 254, 266, and 268, may be interconnected using various buses, and several of the components may be mounted on a common motherboard or in other manners as appropriate.

Processor 252 may execute instructions within mobile computing device 250, including instructions stored in memory 264. Processor 252 may be implemented as a set of chips that may include separate and multiple analog and/or digital processors. Processor 252 may provide, for example, for coordination of the other components of mobile computing device 250, such as, for example, control of user interfaces, applications run by mobile computing device 250, and/or wireless communication by mobile computing device 250.

Processor 252 may communicate with a user through control interface 258 and a display interface 256 coupled to a display 254. Display 254 may include, for example, a TFT LCD (Thin-Film-Transistor Liquid Crystal Display), an OLED (Organic Light Emitting Diode) display, and/or other appropriate display technology. Display interface 256 may comprise appropriate circuitry for driving display 254 to present graphical and other information to a user. Control interface 258 may receive commands from a user and convert them for submission to processor 252. In addition, an external interface 262 may be provide in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 may store information within mobile computing device 250. Memory 264 can be implemented as one or more of a computer-readable medium or media, a volatile memory unit or units, or a non-volatile memory unit or units. Expansion memory 274 may also be provided and connected to mobile communication device 250 through expansion interface 272, which may include, for example, a SIMM (Single In Line Memory Module) card interface. Such expansion memory 274 may provide extra storage space for mobile computing device 250, or may also store applications or other information for mobile computing device 250. Specifically, expansion memory 274 may include instructions to carry out or supplement the processes described above, and may also include secure information. Thus, for example, expansion memory 274 may be provided as a security module for mobile computing device 250, and may be programmed with instructions that permit secure use of mobile computing device 250. In addition, secure applications may be provided via SIMM cards, along with additional information, such as placing identifying information on a SIMM card in a non-hackable manner.

Memory 264 and/or expansion memory 274 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 264, expansion memory 274, or memory included within processor 252, that may be received, for example, over transceiver 268 or over external interface 262.

Mobile computing device 250 may communicate wirelessly through a communication interface 266, which may include digital signal processing circuitry where necessary. Communication interface 266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268. In addition, short-range communication may occur, such as using a Bluetooth, WiFi, or other such transceiver (not shown). In addition, a Global Positioning System (GPS) receiver module 270 may provide additional navigation- and location-related wireless data to mobile computing device 250, which may be used as appropriate by applications running on mobile computing device 250.

Mobile computing device 250 may also communicate audibly using an audio codec 260, which may receive spoken information from a user and convert it to usable digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.) and may also include sound generated by applications operating on mobile computing device 250.

Mobile computing device 250 may be implemented in a number of different forms, as shown in FIG. 2. For example, it may be implemented as a cellular telephone 280. It may also be implemented as part of a smart phone 282, a personal digital assistant, and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" "computer-readable medium" may refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a LAN, a WAN, and the Internet.

Although FIG. 2 shows example components of computing device 200 and mobile computing device 250, computing device 200 or mobile computing device 250 may include fewer components, different components, additional components, or differently arranged components than depicted in FIG. 2. Additionally or alternatively, one or more components of computing device 200 or mobile computing device 250 may perform one or more tasks described as being performed by one or more other components of computing device 200 or mobile computing device 250.

Figure 3:
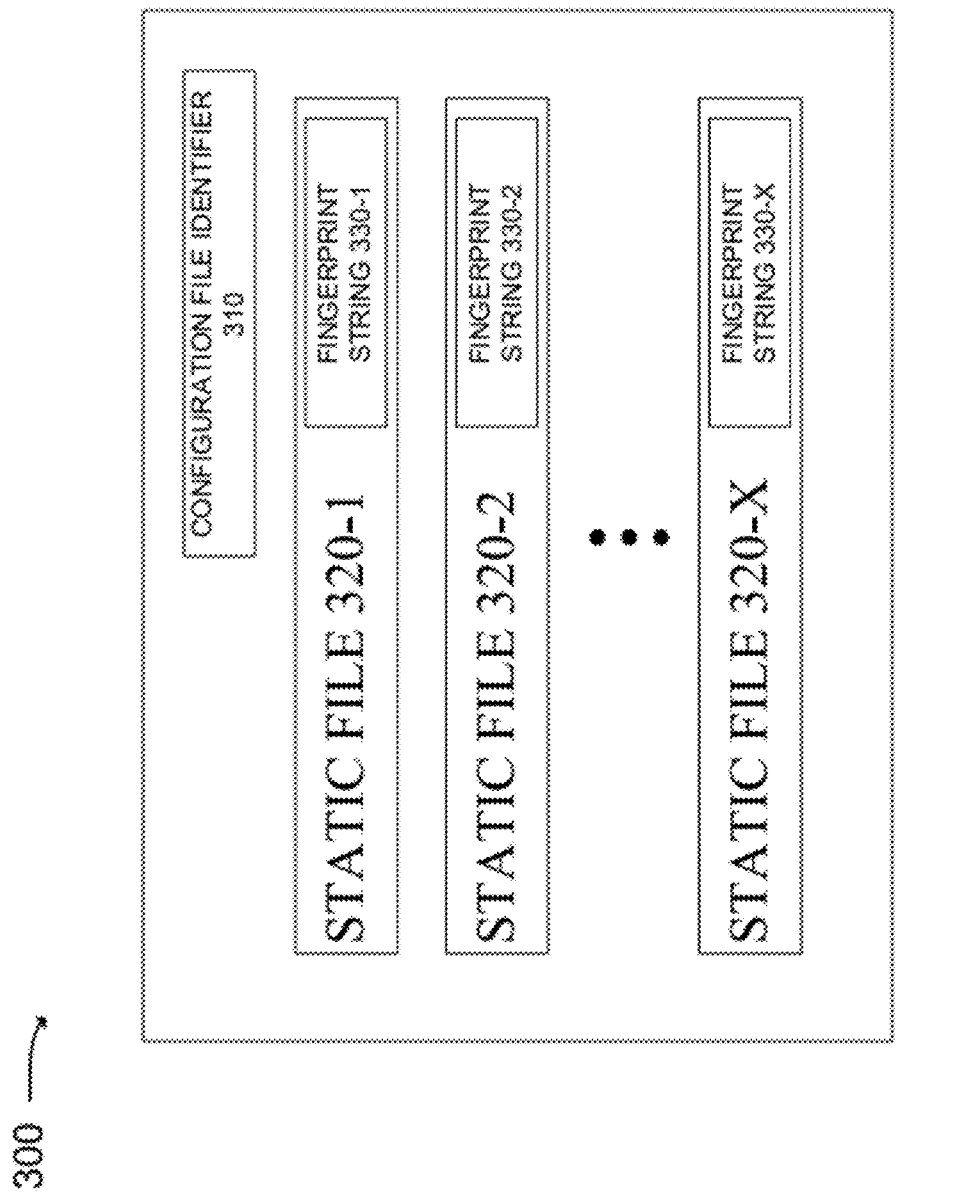
FIG. 3 illustrates an example configuration file.

FIG. 3 illustrates an example configuration file 300. Plug-in system 120 may generate, store, and/or access configuration file 300. In one implementation, configuration file 300 may be in an extensible markup language (XML) format. In another implementation, configuration file 300 may be composed of one or more different types of data structures.

As shown in FIG. 3, configuration file 300 may include a configuration file identifier 310 and static files 320-1, 320-2, ..., 320-X (X≧1) (collectively referred to as "static files 320" and individually as "static file 320"). Each one of static files 320-1, 320-2, ..., 320-X may include one of fingerprint strings 330-1, 330-2, ..., 330-X (collectively referred to as "fingerprint strings 330" and individually as "fingerprint string 330"), respectively.

Configuration file identifier 310 may uniquely identify configuration file 310. In one implementation, configuration file identifier 310 may include a top-level domain, such as www.example.com, that is associated with web pages provided by servers 130. In another implementation, configuration file identifier 310 may include a file name, such as configfile3567.xml, that is used by plug-in system 120 for the file. Additionally, or alternatively, configuration file identifier 310 may include an indicator that specifies a version of configuration file 300. In one implementation, the indicator may include a version, such as 3.4, or a score assigned to configuration file 300 by plug-in system 120. Plug-in system 120 may determine the score based on static files 320 that are included in configuration file 300. In another implementation, the indicator may include a date and/or a time associated with configuration file 300. The date and/or the time may specify, for example, when plug-in system 120 generated configuration file 300 or provided configuration file 300 to client device 110. Client device 110 and/or plug-in system 120 may use configuration file identifier 310 to determine whether an updated configuration file 300 exists.

Static files 320 may include, for example, one or more of an image file, a JavaScript file, a cascading style sheet (CSS) file, a dynamic content file, etc. For example, static file 320-1 may include an image file of a logo, such as logo.png, that is used for a web page provided by server 130-1 to client devices 110 for an email service. In one implementation, each static file 320 may be used for web pages provided by a single server 130. In another implementation, each static file 320 may be used for web pages provided by one or more servers 130.

Fingerprint string 330 may uniquely identify static file 320. In one implementation, fingerprint string 330 may include a string, such as a 64 bit string, that is calculated/generated based on contents of static file 320. When the contents of static file 320 changes of fingerprint string 330, may be recalculated based on the changed contents. In another implementation, fingerprint string 330 may include one or more identifiers associated with server 130, with a web service provided by server 130, and/or with addresses used to access web pages provided by servers 130. Additionally, or alternatively, configuration file identifier 310 may include an indicator that specifies a version of static file 320. The indicator may be of a same type or of a different type than the one used to indicate the version of configuration file 320. Client device 110 may determine whether configuration file 300 includes an updated static file 320 for a particular web page based on fingerprint string 330.

Figure 4:
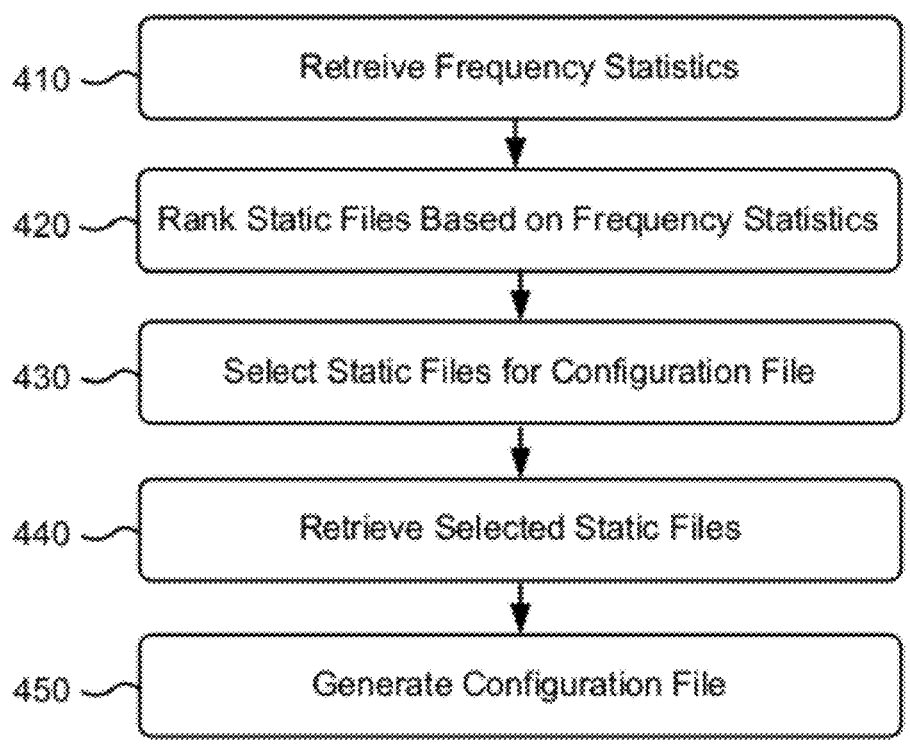
FIG. 4 is a flow chart illustrating an example process for generating a configuration file.

FIG. 4 is a flow chart illustrating an example process 400 for generating a configuration file. In one implementation, plug-in system 120 may perform process 400. In other implementations, one or more other devices, separate from, or in combination with, plug-in system 120, may perform some or all of process 400.

As shown in FIG. 4, process 400 may include retrieving frequency statistics (block 410). For example, server 130 may host a website, such as a website used for an email service. To access the web service, client devices 110 may download web pages from server 130. The web pages may require static files for the web pages to be properly displayed in web browsers by client devices 110. Client devices 110 may download the static files from server 130 when the static files are not stored in memory local to, such as caches of, client devices 110. Server 130 may collect frequency statistics that specify which static files are downloaded from server 130 and/or which static files are required by the web pages that are downloaded from server 130. The frequency statistics may include a quantity of times for each one of the static files. Plug-in system 120 may retrieve the frequency statistics from server 130 and/or from one or more other servers 130 that host one or more other websites. To retrieve the frequency statistics, plug-in system 120 may transmit a request for the frequency statistics to servers 130, and may receive the frequency statistics in response to the request. In another implementation, plug-in system 120 may retrieve the frequency statistics from one or more other types of sources that are different from servers 130. For example, plug-in system 120 may retrieve the frequency statistics from the plug-ins of clients 110.

Process 400 may further include ranking static files based on the frequency statistics (block 420) and selecting static files for a configuration file (block 430). In one implementation, plug-in system 120 may rank the different static files that are provided by servers 130 based on the frequency statistics and/or sizes of the different static files. For example, plug-in system 120 may rank a first static file higher than a second static file when the first static file is downloaded by client devices 110 more times than the second static file. Plug-in system 120 may select a particular quantity of the ranked static files that are ranked higher than the other ranked static files. In another implementation, plug-in system 120 may select static files which are individually downloaded by client devices 110 more than a particular quantity of times. In other implementations, plug-in system 120 may use one or more other techniques/algorithms for selecting static files.

Process 400 may also include retrieving the selected static files (block 440). For example, plug-in system 120 may retrieve the selected static files from servers 130. In one implementation, for each one of the selected static files, plug-in system 120 may identify which server 130 provides the particular static file. Plug-in system 120 may generate a request for the particular static file, and may transmit the request to the identified server 130. In response to the request, plug-in system 120 may receive the particular static file from the identified server 130. In this manner, plug-in system 120 may receive all the selected static files from servers 130. In another implementation, plug-in system 120 may determine and/or retrieve links to the selected static files.

Process 400 may also include generating the configuration file (block 450). For example, plug-in system 120 may generate configuration file 300 (FIG. 3) based on the received static files 320 (FIG. 3). In one implementation, plug-in system 120 may generate configuration file identifier 310 (FIG. 3) for configuration file 300. Configuration file identifier 310 may include an identifier, such as a top-level domain, associated with server(s) 130 and/or a version of configuration file 300, such as a code that represents a date and a time. Plug-in system 120 may include configuration file identifier 310 in configuration file 300. Plug-in system 120 may further generate fingerprint string 330 (FIG. 3) for each static file 320 that is to be included in configuration file 300. Fingerprint string 330 may include a string that represents content of a corresponding static file 320. Plug-in system 120 may include static files 320, along with the corresponding fingerprint strings 330, in configuration file 300. In another implementation, plug-in system 120 may generate configuration 300 file that includes configuration file identifier 310 and the links to the selected static files.

Figure 5:
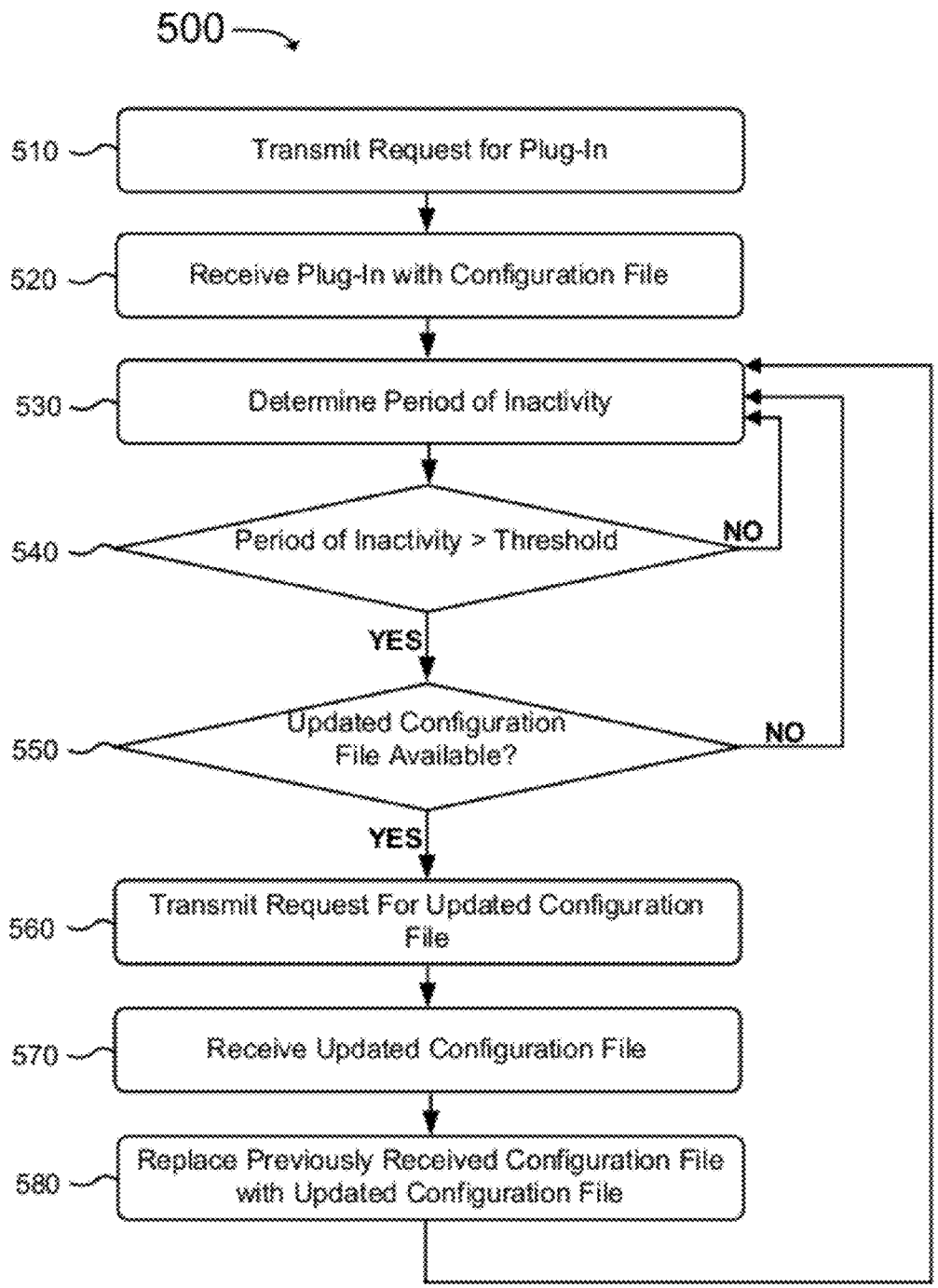
FIG. 5 is a flow chart illustrating an example process for retrieving configuration files.

FIG. 5 is a flow chart illustrating an example process 500 for retrieving configuration files. In one implementation, client device 110 may perform process 500. In other implementations, one or more other devices, separate from, or in combination with, client device 110, may perform some or all of process 500.

As shown in FIG. 5, process 500 may include transmitting a request for a plug-in (block 510) and receiving the plug-in with a configuration file (block 520). For example, a user may use client device 110 to open a web browser. The user may use the web browser to request a plug-in, such as a toolbar, for the web browser. In one implementation, client device 110 may transmit a request for the plug-in to plug-in system 120. In another implementation, client device 110 may transmit a request for the plug-in to server 130, and server 130 may forward the request to plug-in system 120. In yet another implementation, client device 110 may transmit, to plug-in system 120 or server 130, a request for the configuration file after receiving the plug-in. In other implementations, instead of requesting a plug-in, client device 110 may transmit a request for a browser update that includes configuration file 300. In still other implementations, the web browser may have built-in functionality that automatically transmits a request for configuration file 300. In response to the request, client device 110 may receive, from plug-in system 120 or server 130, the plug-in with configuration file 300, the browser update with configuration file 300, or configuration file 300 by itself (i.e., not as part of a plug-in or a browser update). In the description of FIG. 5 below, a plug-in may refer to a browser update or to configuration file 300 that is received without a plug-in.

Plug-in system 120 may retrieve configuration file 300 that was most recently generated by plug-in system 120. Plug-in system 120 may include the configuration file in the requested plug-in. Plug-in system 120 may transmit the requested plug-in with the configuration file to client device 110, and client device 110 may receive the requested plug-in with the configuration file. Client device 110 may store the configuration file in a memory local to client device 110, such as in a cache of the web browser. Client device 110 may retrieve one or more static files 320 from configuration file 300 instead of downloading the one or more static files 320 from one or more servers 130, as described further below with reference to FIG. 6.

Process 500 may further include determining a period of inactivity (block 530) and determining whether the period of inactivity is greater than a threshold (block 540). For example, client device 110 may determine a period of inactivity associated with the web browser of client device 110. The period of inactivity may include, for example, a period of time for which the web browser of client device 110 has continuously not been used by the user of client device 110 until a current time. The period of inactivity may restart at 0 seconds whenever the user starts and finishes using the web browser. Process 500 may determine whether the period of inactivity is greater than a threshold, such as 3 minute or 5 minutes. In one example, client device 110 may determine that the period of inactivity is greater than the threshold when the user continuously does not use client device 110 for a period of time that is greater than the threshold. In another example, client device 110 may determine that the period of inactivity is greater than the threshold when the user uses one or more applications, of client device 110, that are different from the web browser for a period of time that is greater than the threshold.

If the period of inactivity is greater than the threshold (block 540—YES), process 500 may include determining whether an updated configuration file is available (block 550). For example, when client device 110 determines that the period of inactivity is greater than the threshold, client device 110 may determine whether an updated configuration file is available. The updated configuration file may be a configuration file that was generated by plug-in system 120 after client device 110 previously received configuration file 300. In one implementation, client device 110 may transmit, to plug-in system 120, a request for an identifier of a configuration file that was most recently generated by plug-in system 120, and client device 110 may receive the requested identifier in response. Client device 110 may determine whether the requested identifier matches configuration file identifier 310 of previously received configuration file 300. If the requested identifier does not match configuration file identifier 310, client device 110 may determine that an updated configuration file is available, which is the configuration file that was most recently generated by plug-in system 120.

In another implementation, client device 110 may transmit, to plug-in system 120, a request to verify that previously received configuration file 300 is the configuration file that was most recently generated by plug-in system 120. The request to verify may include configuration file identifier 310, a portion of configuration file identifier 310, and/or information based on configuration file identifier 310. Client device 110 may receive a response, to the request to verify, that indicates whether previously received configuration file 300 is the configuration file that was most recently generated by plug-in system 120. Client device 110 may determine that an updated configuration file is available when the response indicates that previously received configuration file 300 is not the configuration file that was most recently generated by plug-in system 120.

In yet another implementation, previously received configuration file 300 may include and/or client device 110 may have access to update information. The update information may indicate when the next updated configuration file will be available. The update information may include, for example, a time when the next updated configuration file will be available, such as 12:00 AM, Jun. 10, 2012, or information regarding how often updates occur, such as every hour or every 24 hours. Client device 110 may determine that an updated configuration file is available when the time for the updated configuration file being available has passed based on the update information.

If an updated configuration file is available (block 550—YES), process 500 may include transmitting a request for the updated configuration file (block 560), receiving the updated configuration file (block 570), and replacing the previously received configuration file with the updated configuration file (block 580). For example, when client device 110 determines that the updated configuration file is available, client device 110 may transmit a request for the updated configuration file to plug-in system 120. In response to the request for the updated configuration file, plug-in system 120 may retrieve the updated configuration file, which is the configuration file that was most recently generated by plug-in system 120. Plug-in system 120 may transmit the updated configuration file to client device 110, and client device 110 may receive the updated configuration file. The updated configuration file may include one or more statistic files that are same as, or different from, the previously received configuration file 300. Client device 110 may replace the previously received configuration file 300 with the updated configuration file. Accordingly, in reference to the description of FIG. 5, the updated configuration file may now be considered the previously received configuration file 300.

If the period of inactivity is not greater than the threshold (block 540—NO), if an updated configuration file is not available (block 550—NO), or after replacing the previously received configuration file with the updated configuration file (block 580), process 500 may again include determining a period of inactivity (block 530). For example, when client device 110 determines that the period of inactivity is not greater than the threshold, when client device 110 determines that the updated configuration file is not available, or after replacing the previously received configuration file 300 with the updated configuration file, client device 110 may again determine the period of inactivity, as described above.

Additionally, or alternatively, as described above, client device 110 may receive configuration file 300 that includes links to static files 320 instead of static files 320. In one implementation, when client device 110 determines that the period of inactivity is greater than the threshold (block 540—YES), client device 110 may download static files 320 based on the links. In another implementation, client device 110 may download particular static files while downloading web pages. Client device 110 may determine, based on the links, that one or more of the particular static files match/correspond to one or more static files 320, and may store the one or more of the particular static files in the memory local to client device 110 in association with configuration file 300.

Figure 6:
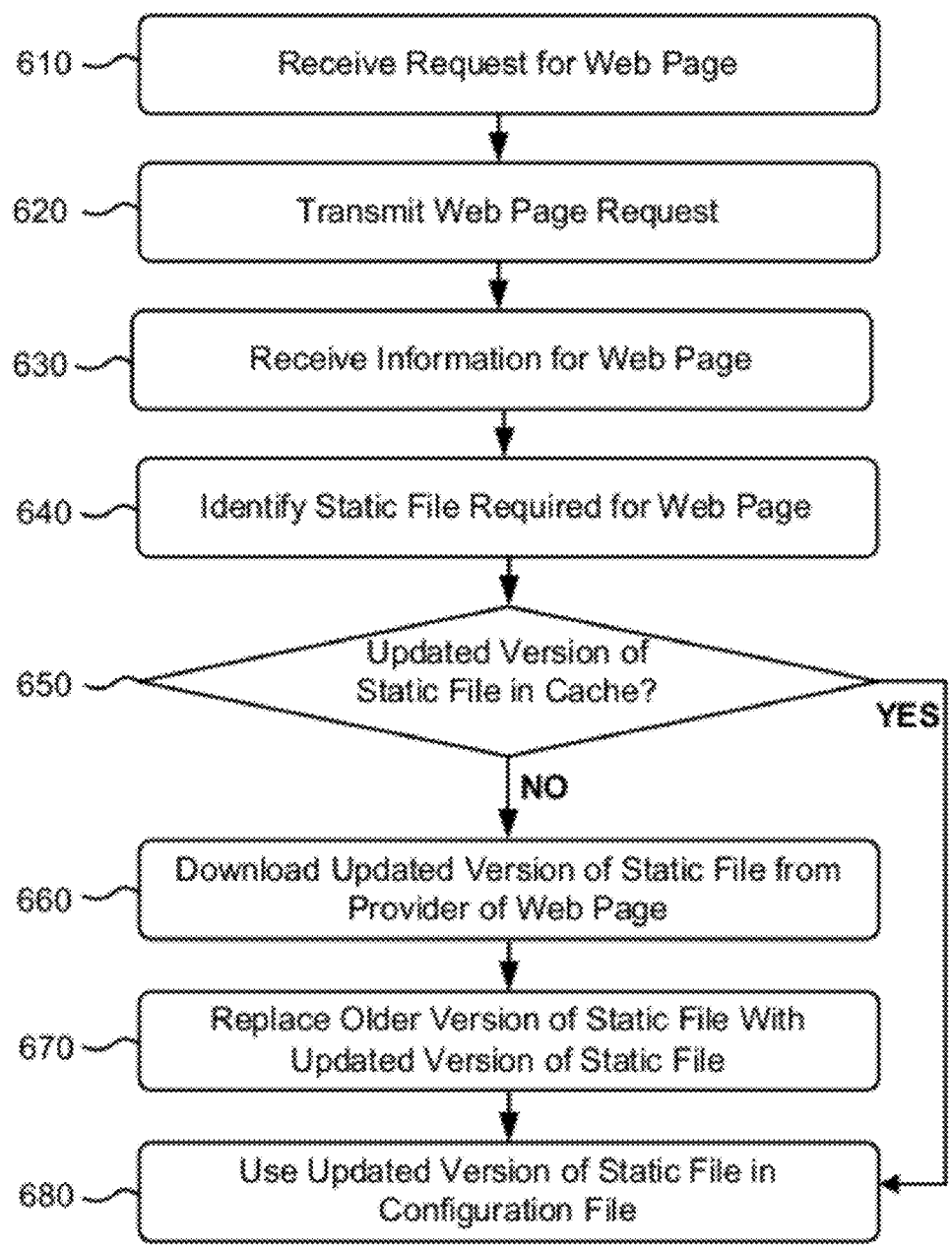
FIG. 6 is a flow chart illustrating an example process for using a static file of a configuration file.

FIG. 6 is a flow chart illustrating an example process 600 for using a static file of a configuration file. In one implementation, client device 110 may perform process 600. In other implementations, one or more other devices, separate from, or in combination with, client device 110, may perform some or all of process 600.

As shown in FIG. 6, process 600 may include receiving a request for a web page (block 610), transmitting a web page request (block 620), and receiving information for the web page (block 630). For example, a user may use client device 110 to open a web browser. Client device 110 may receive a request for a web page, of a website provided by server 130, when a user enters a Uniform Resource Identifier (URI), such as a Uniform Resource Locator (URL), of the web page into an address bar of the web browser or when the user selects a hyperlink to the web page. Client device 110 may transmit a web page request, to request the web page, to server 130, which hosts the website that includes the web page. Server 130 may receive the web page request, retrieve information, such as hypertext markup language (HTML) code, for the web page, and may transmit the information for the web page to client device 110.

Process 600 may further include identifying a static file required for the web page (block 640). For example, client device 110 may store configuration file 300 in a cache of the web browser. Client device 110 may identify configuration file 300 based on configuration file identifier 310, of configuration file 300, and a top-level domain included in the URI of the web page. In one implementation, client device 110 may identify which static file 320 is required for the web page based on the URI. In another implementation, the information for the web page may specify which static file 320 is required for the web page. Client device 110 may identify static file 320 based on the information for the web page.

Process 600 may also include determining whether an updated version of the static file is in a cache (block 650). For example, client device 110 may determine whether an updated version of static file 320 is in the cache of the web browser. The updated version of the static file may refer to a most recent version of the static file that is provided by web server 130 for the web page. The information for the web page may specify the updated version of static file 320 that is required for the web page. In one implementation, client device 110 may determine based on fingerprint string 330, corresponding to static file 320, whether configuration file 300, which is stored in the cache, includes the updated version of static file 320. In one example, client device 110 may determine that the updated version of static file is not in the cache, when an identifier, included in the information for the web page, of the updated version of static file 320 does not match fingerprint string 330 that corresponds to static file 320.

If the updated version of the static file is not in the cache (block 650—NO), process 600 may include downloading the updated version of the static file from a provider of the web page (block 660) and replacing an older version of the static file with the updated version of the static file (block 670). For example, when client device 110 determines that the updated version of static file 320 is not in the cache, client device 110 may download the updated version of static file 320 from server 130, which provided the information for the web page. Client device 110 may replace an older version of static file 320, which is in configuration file 300, with the updated version of static file 320. Thereafter, client device 110 may retrieve the updated version of static file 320 from configuration file 300 without having to download the updated version of static file 320 from server 320.

In one implementation, when client device 110 determines that the updated version of static file 320 is not in the cache, client device 110 may use the older version of static file 320, which is in the cache to display the web page until updated version of static file 320 is downloaded from server 320. In other words, client device 110 may use the older version of static file 320 to display the web page, may retrieve the updated version of static file 320, and then may use the updated version of static file 320, instead of the older version of static file 320, to display the web page.

If the updated version of the static file is in the cache (block 650—YES) or after replacing the older version of the static file with the updated version of the static file (block 670), process 600 may include using the updated version of the static file in the configuration file (block 680). For example, client device 110 may retrieve the updated version of static file 320 from configuration file 300. Client device 110 may use the updated version of static file 320 and the information for the web page to display a representation of the web page in the web browser of client device 110. In another implementation, client device 110 may use the updated version of static file 320 to display the representation of the web page before, or while, replacing the older version of static file 320 with the updated version of static file 320.

Although process 600 is described above with reference to using a single static file 320 for a web page, client device 600 may perform process 600 for a web page that requires multiple static files 320. Before client device 110 performs process 600, configuration file 300 may store updated versions of one or more of the multiple static files 320 and/or older versions of one or more of the multiple static files 320. During process 600, client device 110 may replace all of the older versions of the multiple static files 320 with corresponding updated versions of static files 320.

Figure 7:
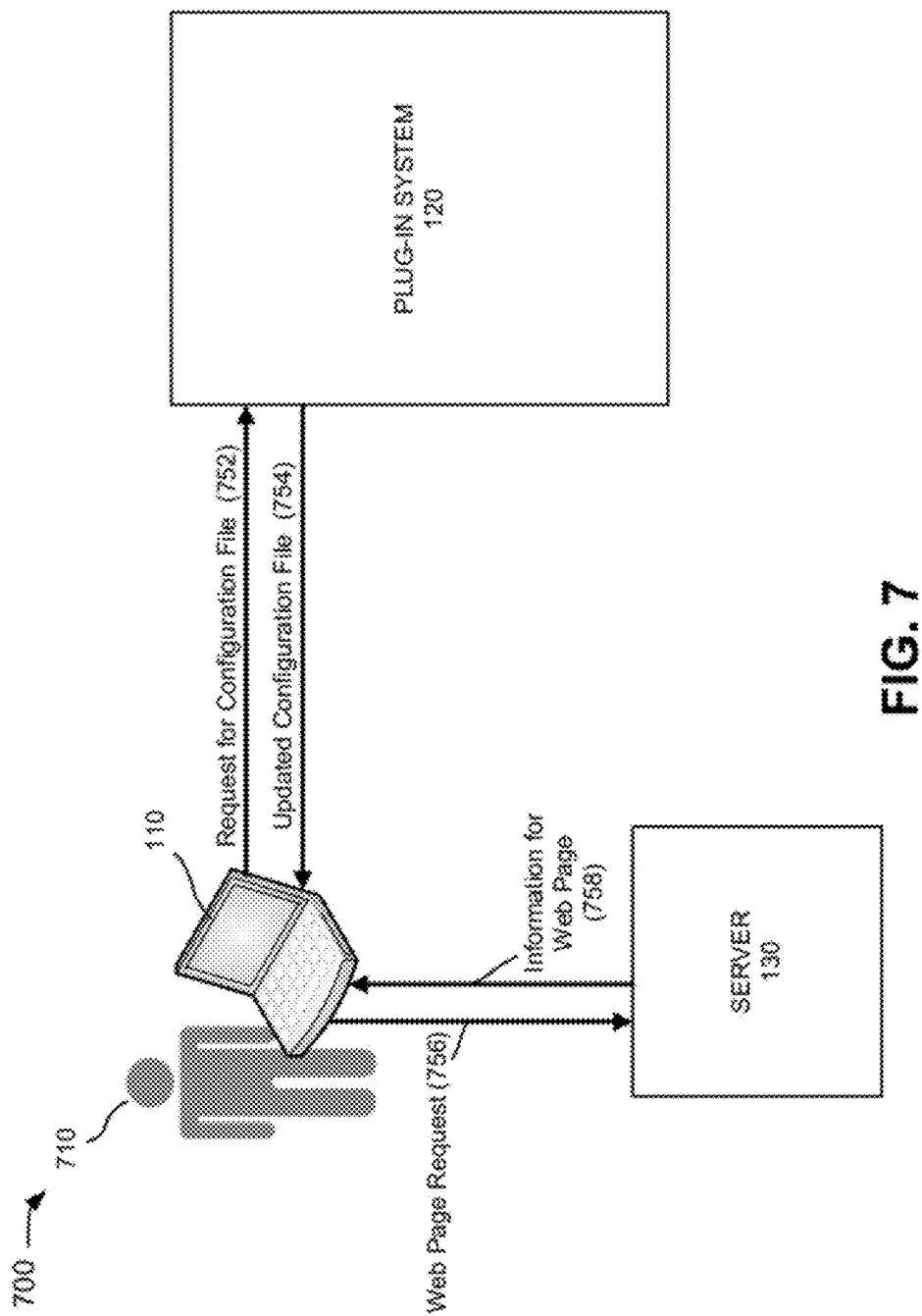
FIG. 7 illustrates an example of using a static file of a configuration file.

FIG. 7 illustrates an example 700 of using a static file of a configuration file. User 710 may use client device 110 to open a window of a web browser in a display of client device 110. Assume that configuration file 300 is stored in a local memory of client device 110. Assume that user 710 does not use the web browser for a particular period of time, such as more than 3 minutes. When this occurs, client device 110 may determine that an updated configuration file 300 is available, and client device 110 may transmit a request for the updated configuration file to plug-in system 120 (shown as 752 in FIG. 7). In response to request 752, plug-in system 120 may transmit an updated configuration file 300 to client device 110 (shown as 754 in FIG. 7). Client device 110 may replace, in the local memory, the previously stored configuration file 300 with updated configuration file 300.

Further assume that user 710 enters a URL of a web page into an address bar of the web browser of client device 110. Client device 110 may transmit a web page request, for the web page, to server 130, which is associated with the URL (shown as 756 in FIG. 7). In response to the web page request, server 130 may transmit the information for the web page to client device 110 (shown as 758 in FIG. 7). Client device 110 may receive the information, and may determine that static file 320 is required to properly display the web page based on the information from server 130. Client device 110 may further determine whether updated configuration file 300 includes an updated version of static file 320 that is specified in the information from server 130. When updated configuration file 300 includes the updated version of static file 320, client device 110 may retrieve the updated version of static file 320 from updated configuration file 300. Client device 110 may use the updated version of static file 320 and/or the information, from server 130, to display the web page in the browser of client device 110.

As a result, client device 110 does not have to download the updated version of static file 320 from server 130. Accordingly, user 710 does not have to wait until the updated version of static file 320 is downloaded from server 130 before the web page is properly displayed in the browser.

The foregoing description provides illustration and description, but is not intended to be exhaustive or to limit the embodiments to the precise form disclosed. Modifications and variations are possible in light of the above teachings or may be acquired from practice of these embodiments.

For example, while series of blocks have been described with regard to FIGS. 4-6, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

Also, certain portions of the implementations have been described as a "component" that performs one or more functions. The term "component" may include hardware, such as a processor, an ASIC (application-specific integrated circuit), or an FPGA (field programmable gate array), or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device, a configuration file,
      the configuration file including a reference to a static file associated with a web page of a website, and
      the static file being ranked as a most-downloaded static file, of a plurality of static files, by a provider of the configuration file and the website,
   storing, by the computing device, the configuration file in a memory local to the computing device;

retrieving, by the computing device, the static file based on the reference;

storing, by the computing device, the static file in the memory local to the computing device;

receiving, by the computing device, a request for the web page;

identifying, by the computing device, the static file for the web page;

using, by the computing device, the static file to display the web page in a browser associated with the computing device;

determining, by the computing device, whether a period of inactivity of the browser is greater than a threshold;

identifying, by the computing device, a first identifier associated with an updated configuration file;

determining, by the computing device, whether the first identifier matches a second identifier of the configuration file;

transmitting, by the computing device and to the provider, a request for the updated configuration file when the period of inactivity is greater than the threshold and when the first identifier does not match the second identifier;

receiving, by the computing device, the updated configuration file from the provider; and replacing, by the computing device, the configuration file, in the memory local to the computer device, with the updated configuration file.

2. The method of claim 1, where using the static file comprises:

determining whether a version of the static file, stored in the memory local to the computing device, matches a version of the static file needed for the web page, and retrieving the static file from the memory local to the computing device when the version of the static file, stored in the memory local to the computing device, matches the version of the static file needed for the web page.

3. The method of claim 2, where, when the version of the static file, stored in the memory local to the computing device, does not match the version of the static file needed for the web page, the method further comprises:

downloading an updated version of the static file from a provider of the web page, replacing the static file, in the memory local to the computing device, with the updated version of the static file, and using the updated version of the static file to display the web page in the browser associated with the computing device.

4. The method of claim 1, where the configuration file further comprises a second reference to a second static file associated with a second web page of a second website, where the website is different from the second website, and where the second static file is ranked as a second most-downloaded static file, of the plurality of static files, by the provider.

5. The method of claim 1, where the updated configuration file comprises:

a first reference to a new version of the static file, and a second reference to a second static file associated with a second web page of a second website, and where the configuration file does not include any static file associated with the second website.

6. The method of claim 1, where receiving the configuration file comprises:

transmitting, to a provider of the configuration file, a request for a plug-in or update for the browser; and receiving the plug-in or update with the configuration file.

7. The method of claim 1, where the static file is one of an image file, a JavaScript file, a cascading style sheet (CSS) file, or a dynamic content file.

8. A non-transitory computer-readable medium comprising:

a plurality of instructions which, when executed by at least one processor of a computing device, cause the at least one processor to:

receive a configuration file, the configuration file including a reference to a static file associated with a web page of a website, and the static file being ranked as a most-downloaded static file, of a plurality of static files, by a provider of the configuration file and the website, retrieve the static file based on the reference, store the static file in a memory local to the computing device, receive a request for the web page, identify the static file for the web page, and use the static file to display the web page in a browser associated with the computing device, determine whether a period of inactivity of the browser is greater than a threshold, identify a first identifier associated with an updated configuration file, determine whether the first identifier matches a second identifier of the configuration file, transmit, to the provider, a request for an updated configuration file when the period of inactivity is greater than the threshold and when the first identifier does not match the second identifier, receive the updated configuration file from the provider, and replace the configuration file, in the memory local to the computer device, with the updated configuration file.

9. The computer-readable medium of claim 8, where one or more instructions, of the plurality of the instructions, to identify the static file comprise one or more instructions to:

transmit a web page request for the web page to the provider of the web page, receive information for the web page from the provider, and identify the static file based on the information.

10. The computer-readable medium of claim 8, where the static file is one of an image file, a JavaScript file, a cascading style sheet (CSS) file, or a dynamic content file.

11. The computer-readable medium of claim 8, where one or more instructions, of the plurality of instructions, to receive the configuration file comprise one or more instructions to:

transmit a request for a plug-in or update for the browser, receive the plug-in or the update, where the plug-in or update includes the configuration file, and store the configuration file in the memory local to the computer device.

12. The computer-readable medium of claim 8, where the updated configuration file comprises:

a first reference to a new version of the static file, and a second reference to a different static file required for the web page or a different web page.

13. A system comprising:
a memory to store a configuration file and a static file,
- the configuration file including a reference to the static file,
- the static file being for a web page, and
- the static file being ranked as a most-downloaded static file, of a plurality of static files, by a provider of the configuration file; and a processor to:
- retrieve the static filed based on the reference,
- store the static filed in the memory,
- transmit a request for the web page to a server that provides the web page,
- receive information associated with the web page from the server,
- identify the static file for the web page based on the information,
- use the static file to display the web page in a browser,
- determine whether a period of inactivity of the browser is greater than a threshold,
- identify a first identifier associated with an updated configuration file,
- determine whether the first identifier matches a second identifier of the configuration file,
- transmit a request for the updated configuration file when the period of inactivity is greater than the threshold and when the first identifier does not match the second identifier,
- receive the updated configuration file from the provider based on the request for the updated configuration file, and
- replace the configuration file, in the memory, with the updated configuration file.

14. The system of claim 13, where the processor is further to:
- transmit a request for an update for the browser,
- receive the update with the configuration file, and
- store the configuration file in the memory.

15. The system of claim 13, where the processor is further to:
- transmit a request for a plug-in for the browser,
- receive the plug-in with the configuration file, and
- store the configuration file in the memory.

* * * * *